No. 884,334. PATENTED APR. 7, 1908.
P. C. JACKSON.
HAY RACK.
APPLICATION FILED AUG. 22, 1907.
2 SHEETS—SHEET 2.
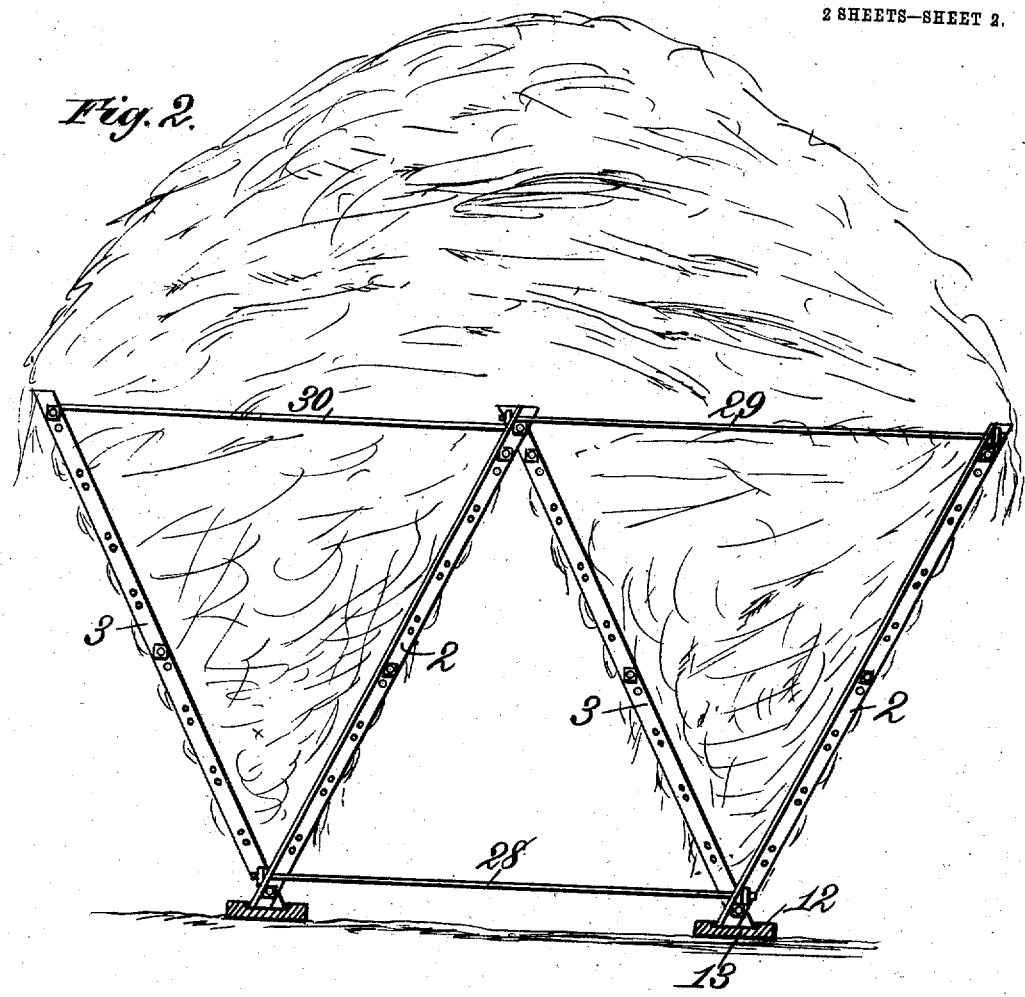
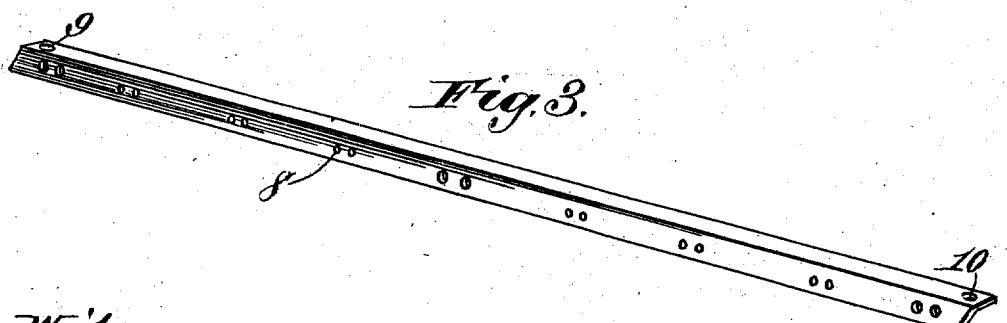
Witnesses.
Robert Everitt,
H. B. Keefe
Inventor.
Peter C. Jackson,
By
James L. Norris
Atty.

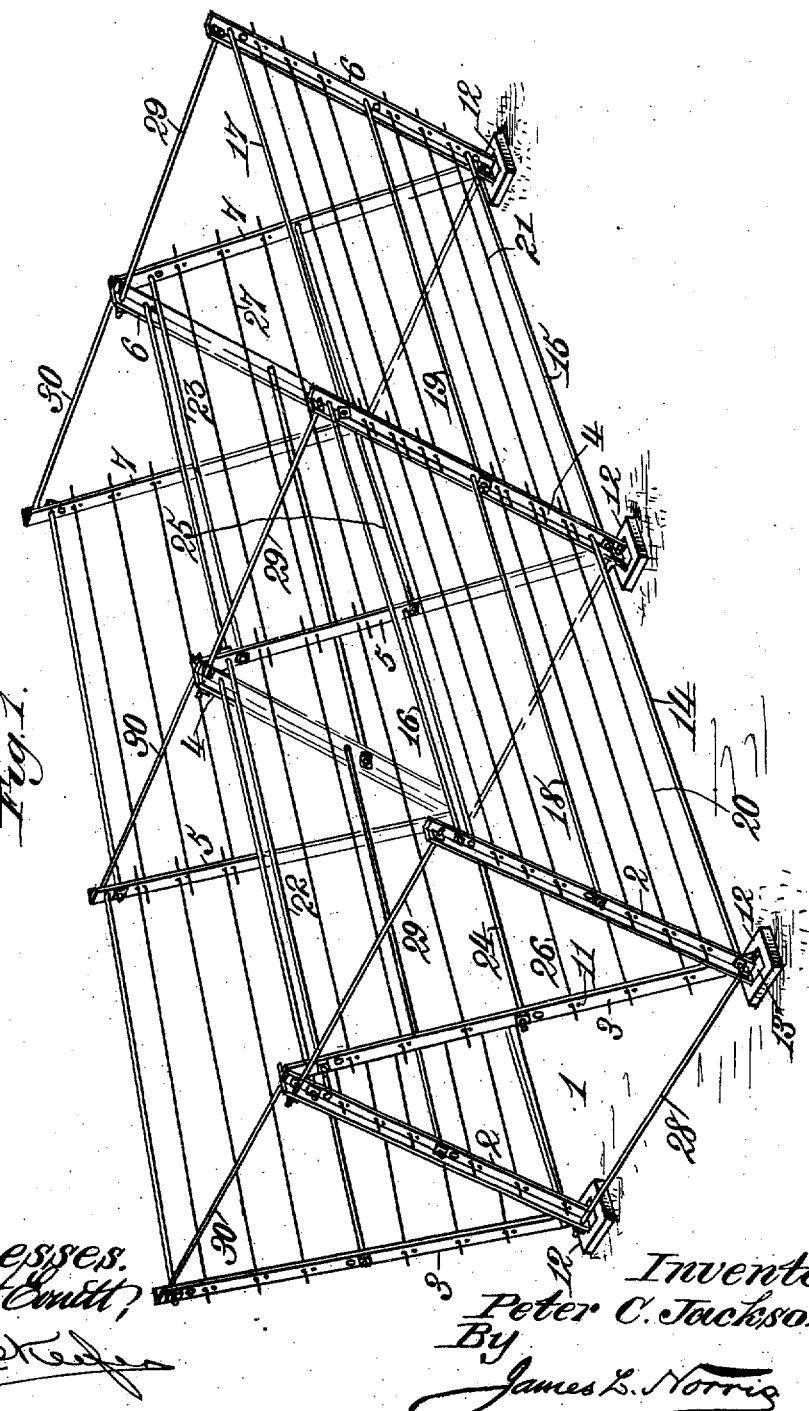

UNITED STATES PATENT OFFICE.

PETER C. JACKSON, OF LOMETA, TEXAS.

HAY-RACK.

No. 884,334.  Specification of Letters Patent.  Patented April 7, 1908.

Application filed August 22, 1907. Serial No. 389,714.

*To all whom it may concern:*

Be it known that I, PETER C. JACKSON, a citizen of the United States, residing at Lometa, in the county of Lampasas and State of Texas, have invented new and useful Improvements in Hay-Racks, of which the following is a specification.

This invention relates to hay racks, and the object thereof is to provide a rack of such class in a manner as hereinafter set forth, whereby a shelter is provided for live stock after the hay has been racked and whereby the hay when racked is supported above the ground, thereby preventing loss from dampness.

A further object of the invention is to provide a hay rack in a manner as hereinafter set forth, whereby when the hay is racked the live stock can readily have access thereto and feed at will.

A further object of the invention is to provide a hay rack in a manner as hereinafter set forth for racking hay in such manner as to enable the stock to have access for feeding purposes to the ends, sides and interior of the rack, under such circumstances enabling a large number of animals to feed at the same time.

A further object of the invention is to provide a hay rack which shall be simple in its construction, strong, durable, efficient in its use, readily set up, allowing for the hay or forage to be conveniently racked, and comparatively inexpensive to build.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views, and in which:—

Figure 1 is a perspective view of a hay rack in accordance with this invention. Fig. 2 is an end view, and Fig. 3 is a detail of one of the uprights.

A hay rack in accordance with this invention is formed of two V-shaped sections, one connected to the other so as to form an inclosed space 1 for sheltering the live stock when the hay is racked. As each of the sections is formed of like parts, but one section will be described, the same reference characters applied to both sections.

Each of the sections consists of a plurality of pairs of uprights. As shown three pairs of uprights are employed, but it is evident that this number can be increased or diminished. The uprights of each pair are indicated by the reference characters 2—3, 4—5, and 6—7, respectively. The uprights of each pair extend at an inclination with respect to each other. The upright 2 is in the form of an angle iron and one angular portion thereof is formed with a plurality of openings 8 while the other angular portion is provided at its top and bottom with the openings 9—10. The upright 3 is in the form of an angle iron and has one angular portion provided with a plurality of pairs of openings 11. The uprights of each pair cross each other at the bottom and engage in base pieces 12. A recess 13 is formed in the upper face of each of the base pieces to receive the lower ends of the uprights of each pair, the lower ends of the uprights of each pair abutting against the side walls of the recesses. Extending through the lower end of the uprights 2—3 is a tie rod 14 which is connected to the lower end of the upright 4. Extending through the lower end of the uprights 4—5 is a tie rod 15 which is connected to the lower end of the upright 6. Extending through the top of the upright 2 and connected to the top of the upright 4 is a tie rod 16 and extending through the top of the upright 4 and engaging the upright 6 is a tie rod 17. Connected to the upright 2 at a point intermediate its ends and to the upright 4 at a point intermediate its ends is a tie rod 18 and connected to the upright 4 at a point intermediate its ends and to the upright 6 at a point intermediate its ends is a tie rod 19. Mounted in certain of the openings 8 of the upright 2 and extending through certain of the openings 8 of the upright 4 is a plurality of rack bars 20 and mounted in certain of the openings 8 of the upright 4 and extending through certain of the openings 8 in the upright 6 is a plurality of rack bars 21. The uprights 3—5 are connected together at their top by the tie rod 22 and the uprights 5—7 are connected together at their top by the tie rod 23. The uprights 3—5 intermediate their ends are connected together by the tie rod 24 and the uprights 5—7 intermediate their ends are connected by the tie rod 25. Mounted in certain of the openings 11 of the upright 3 and extending in certain of the openings 11 of the upright 5 is a series of rack bars 26, and mounted in certain of the openings 11 of the upright 5 and engaging in certain of the openings 11 of the upright 7 is a series of rack bars 27.

The uprights 2, 4, and 6 of one section are connected at their bottom to the uprights 2, 4 and 6 of the other section by the transversely extending tie rods 28 and the uprights 2, 4 and 6 of one section at the top thereof are connected to the top of the uprights 2, 4 and 6 of the other section by the transversely extending tie rods 29. The uprights 3, 5 and 7 of one section are connected at their top to the top of the uprights 3, 5 and 7 of the other section by the transversely extending tie rods 30.

Preferably the parts which form the rack are constructed of metal and detachably secured together so that the rack can be knocked down when occasion so requires and also readily assembled.

The hay can be racked entirely over the sections so that the contour of the mass of hay at the top will be curvilinear, thereby shedding water.

By providing the two V-shaped sections, it is evident that the inclosed space 1 will constitute a shelter for the live stock as well as allowing the live stock to have access to the hay or forage for feeding purposes. The construction of the rack not only provides two internal sides from which the cattle can feed when the hay is racked, but also the cattle can feed from the outer sides of the rack as well as the ends.

As the hay or forage is consumed at the bottom of the rack, it is evident that the weight of the hay will cause it to settle so that the cattle can always have access to the hay for feeding purposes and that owing to the many sides as well as the two ends, it will enable a large number of cattle to feed from a short rack.

What I claim is:—

1. A hay rack comprising a pair of V-shaped sections connected together at their top, each of said sections consisting of a plurality of pairs of uprights, the uprights of each pair extending at an inclination with respect to each other, means for connecting the pairs of uprights together at their bottom, means for connecting the pairs of uprights together at their top, and rack bars supported by the uprights.

2. A hay rack comprising a pair of V-shaped sections connected together at the top thereof, each of said sections embodying a plurality of pairs of uprights, the uprights of each pair extending at an inclination with respect to each other, transversely extending tie rods for connecting the pairs of uprights of one section to the pairs of uprights of the other section at the bottom, longitudinally extending tie rods connecting the pairs of uprights of each section together at the bottom thereof, longitudinally extending tie rods for connecting the pairs of uprights of each section together at the top, and rack bars mounted in the uprights of each section.

3. A hay rack comprising a pair of V-shaped sections connected together at the top, each section comprising a plurality of pairs of uprights, the outer uprights of one section extending in parallelism with the inner uprights of the other section, the inner uprights of the first-mentioned section extending in parallelism with the outer uprights of the last mentioned section, longitudinally and transversely extending rods for connecting the uprights of each section together, and rack bars mounted in said uprights.

In testimony whereof I have hereunto set my hand in presence of two subscribing witnesses.

PETER C. JACKSON.

Witnesses:
J. S. SWINNEY,
J. A. FULTON.